United States Patent
Mäder (10) Patent No.: US 11,524,274 B2
(45) Date of Patent: Dec. 13, 2022

(54) ABSORBENT AND METHOD FOR PRODUCING AN ABSORBENT

(71) Applicant: OTEX AG, Freienbach (CH)

(72) Inventor: Alexandre Mäder, Schindellegi (CH)

(73) Assignee: OTEX AG, Freienbach (CH)

( * ) Notice: Subject to any disclaimer, the term of this patent is extended or adjusted under 35 U.S.C. 154(b) by 492 days.

(21) Appl. No.: 16/640,683

(22) PCT Filed: Aug. 21, 2017

(86) PCT No.: PCT/EP2017/071035
§ 371 (c)(1),
(2) Date: Feb. 20, 2020

(87) PCT Pub. No.: WO2019/037831
PCT Pub. Date: Feb. 28, 2019

(65) Prior Publication Data
US 2020/0353444 A1 Nov. 12, 2020

(51) Int. Cl.
| | | |
|---|---|---|
| *B01J 20/26* | (2006.01) | |
| *B01J 19/06* | (2006.01) | |
| *B01J 20/28* | (2006.01) | |
| *B01J 20/30* | (2006.01) | |
| *B08B 7/00* | (2006.01) | |
| *C02F 1/28* | (2006.01) | |
| *C02F 1/40* | (2006.01) | |
| *C09K 3/32* | (2006.01) | |
| *B01F 23/235* | (2022.01) | |
| *B01F 23/20* | (2022.01) | |
| *B01F 25/433* | (2022.01) | |
| *B01F 25/452* | (2022.01) | |
| *C02F 101/32* | (2006.01) | |
| *C02F 103/00* | (2006.01) | |

(52) U.S. Cl.
CPC .......... *B01J 20/262* (2013.01); *B01F 23/235* (2022.01); *B01F 23/291* (2022.01); *B01F 25/4338* (2022.01); *B01F 25/45241* (2022.01); *B01J 19/06* (2013.01); *B01J 20/261* (2013.01); *B01J 20/28045* (2013.01); *B01J 20/3064* (2013.01); *B01J 20/3085* (2013.01); *B08B 7/0014* (2013.01); *C02F 1/285* (2013.01); *C02F 1/40* (2013.01); *C09K 3/32* (2013.01); *C02F 2101/32* (2013.01); *C02F 2103/007* (2013.01)

(58) Field of Classification Search
CPC . B01J 20/26; B01J 20/262; B01J 19/06; B01J 20/261; B01J 20/28045; B01J 20/3064; B01J 20/3085; B08B 7/0014; C02F 1/285; C02F 1/40; C02F 2101/32; C02F 2103/007; C09K 3/32
USPC ........................................................ 502/402
See application file for complete search history.

(56) References Cited

U.S. PATENT DOCUMENTS 3,209,554 A 10/1965 MacManus

FOREIGN PATENT DOCUMENTS

EP 634430 A1 1/1995

OTHER PUBLICATIONS

International Preliminary Report on Patentability for related PCT App No. PCT/EP2017/071035 dated Mar. 5, 2020, 16 pgs.
International Search Report and Written Opinion for related PCT App No. PCT/EP2017/071035 dated May 17, 2018, 13 pgs.

*Primary Examiner* — Edward M Johnson
(74) *Attorney, Agent, or Firm* — Procopio, Cory, Hargreaves & Savitch LLP (57) ABSTRACT

An absorbent is provided, which is produced from component A, a foaming agent, and component B, a resin. Furthermore, a device and a method for producing the absorbent and a method for absorbing a liquid by means of the absorbent are provided.

17 Claims, 6 Drawing Sheets

ABSORBENT AND METHOD FOR PRODUCING AN ABSORBENT

CROSS-REFERENCE TO RELATED APPLICATIONS

This application is a U.S. National Stage entry of PCT Application No: PCT/EP2017/071035 filed on Aug. 21, 2017, the contents of which are incorporated herein by reference.

The present invention relates to an absorbent for binding a liquid and a device for producing an absorbent.

In a world in which the demand for fossil fuels is constantly increasing, the extraction and also the transport of crude oil and the like are still the order of the day. Unfortunately, both of these inherently carry the far from inconsiderable risk of oil pollution or even oil spills. Such environmental pollution to a greater or lesser extent affects water and land equally, whether through oil tanker accidents, tanker truck accidents, or even major events such as the explosion on the "Deep Water Horizon" oil platform in the Gulf of Mexico in 2010. The environmental impact is considerable; ecosystems are seriously disrupted, groundwater is contaminated, and entire economic sectors such as fishing can come to a complete standstill in the affected areas. To keep these effects as low as possible in the event of an accident, rapid action is required. On the one hand, it is important to prevent the oil from spreading further, while on the other hand, areas that are already contaminated must be cleaned. What is needed for this is a powerful and environmentally friendly absorbent, which is ready for use in a timely manner and can be easily transported.

It is the object of the present invention to provide an absorbent. Another aspect is to provide a 2-component absorbent. Again, another aspect is to provide a device that enables the production of the absorbent. An additional aspect is to provide a method for absorbing liquids.

The object is solved by an absorbent comprising a first component according to claim 1 and a second component according to claim 4.

Specifically, the first component according to claim 1 is a component A, which comprises:
A solvent, especially inorganic solvent;
Sulfonic acid;
Inorganic acid;
Sulfamic acid;
Hardener, especially aryl sulfonic acid;
Alcohol;
Adhesion promoter;
Polyethylene glycol;
Bisphenol.

In an embodiment of component A according to the invention, which may be combined with any of the embodiments yet to be mentioned, unless in contradiction thereto, component A comprises:
Water as a solvent;
Alkylbenzene sulfonic acid as sulfonic acid;
Phosphoric acid as an inorganic acid;
Sulfamic acid;
Xylene sulfonic acid as hardener;
Hexadecanol and/or octadecanol as monohydric alcohol;
Resorcinol as adhesion promoter;
Polyethylene glycol 550 and/or polyethylene glycol 1000 as polyethylene glycol;
Butanediol, in particular 1.4 butanediol, as a dihydric alcohol, also known as diol;
Bisphenol A as bisphenol.

In an embodiment of component A according to the invention, which may be combined with any of the aforementioned embodiments and with any of the embodiments yet to be mentioned, unless in contradiction thereto, component A comprises:
40-60% solvents, in particular 48.2%;
20-30% sulfonic acid 65%, in particular 26.0%;
1-12% inorganic acid 75%, in particular 8.7%;
1-6% sulfamic acid, in particular 3.1%;
1-5% hardener; in particular 2.7%;
1-5% monohydric alcohol, in particular 2.6%;
1-5% adhesion promoter, in particular 2.4%;
2-8% polyethylene glycol; in particular 4.3%;
0.5-5% dihydric alcohol, in particular 1.9%;
0.01-1% bisphenol; in particular 0.1%.

One aspect of the invention relates to the provision of a method for the production of component A. The method, which may be combined with any of the above-mentioned embodiments and with any of the embodiments yet to be mentioned, unless in contradiction thereto, comprises the following steps:
a) Heating of the solvent;
b) Adding the sulfamic acid and the sulfonic acid;
c) Mixing;
d) Adding alcohol, in particular monohydric alcohol;
e) Stirring;
f) Adding the polyethylene glycol;
g) Mixing;
h) Dissolving the bisphenol;
i) Adding the dissolved bisphenol, hardener, adhesion promoter and inorganic acid;
j) Mixing.

The solvent is heated up to 60° C., for example. Step e) of stirring can be carried out for approx. 15-30 min. To carry out step h), the dissolving of the bisphenol, a dialcohol can be used, for example, i.e. the bisphenol can be dissolved in dialcohol and would then be available for step i) as bisphenol dissolved in dialcohol. For example, butanediol, especially 1.4 butanediol, can be used as dialcohol.

Specifically, the second component according to claim 4 is a component B, which comprises:
Solvent, in particular inorganic solvent;
Urea-formaldehyde condensate;
Sugar alcohol;
Diamide;
Polyvinylpyrrolidone.

In an embodiment of component B according to the invention, which may be combined with any of the embodiments yet to be mentioned, unless in contradiction thereto, component B comprises:
Water as a solvent;
Basopor® 293 as urea-formaldehyde condensate;
Sorbitol as sugar alcohol;
Urea as diamide;
Polyvinylpyrrolidone K-90 as polyvinylpyrrolidone.

Basopor® 293 is a water-soluble condensation product based on urea and formaldehyde, marketed by BASF.

In an embodiment of component B according to the invention, which may be combined with any of the aforementioned embodiments and with any of the embodiments yet to be mentioned, unless in contradiction thereto, component B comprises:
35-55% solvents, in particular 46.6%;
30-40% urea-formaldehyde condensate, in particular 34.3%;
5-15% sugar alcohol 70%, in particular 11.5%;
5-10% diamide, in particular 7.35%;

0.01-3% polyvinylpyrrolidone, in particular 0.25%.

One aspect of the invention relates to the provision of a method for producing component B. The method, which may be combined with any of the above-mentioned embodiments and with any of the embodiments yet to be mentioned, unless in contradiction thereto, comprises the following steps:
a) Mixing of the solvent, urea-formaldehyde condensate, sugar alcohol and diamide;
b) Stirring;
c) Adding the polyvinylpyrrolidone;
d) Stirring.

Stirring of step b) can be carried out for 2 h, for example, stirring of step d) for 4 h, for example.

Table 1 shows an overview with three embodiments each (embodiments 1, 2 and 3) for component A and component B. The quantities of the individual ingredients are expressed in mass percent. It is understood that the mass specifications of the individual ingredients of the individual embodiments can be combined to form further embodiments.

TABLE 1

Embodiment 1 to 3 for component A and component B.

| Component | Embodiment 1 [% mass] | Embodiment 2 [% mass] | Embodiment 3 [% mass] |
|---|---|---|---|
| Component A | | | |
| Solvents | 40-60 | 45-55 | 46-50 |
| Sulfonic acid | 20-30 | 23-29 | 24-28 |
| Inorganic acid 75% | 1-12 | 7-10 | 8-9 |
| Sulfamic acid | 1-6 | 2-4 | 2.5-3.5 |
| Aryl sulfonic acid | 1-5 | 2-4 | 2.2-3.2 |
| Monohydric alcohol | 1-5 | 2-3 | 2.3-2.9 |
| Diphenol | 1-5 | 2-3 | 2.1-2.7 |
| PEG | 2-8 | 3-6 | 4.0-4.6 |
| Dialcohol | 0.5-5 | 1-3 | 1.4-2.4 |
| Bisphenol | 0.01-1 | 0.1-0.5 | 0.05-0.15 |
| Component B | | | |
| Solvent | 35-55 | 40-50 | 42-49 |
| Urea-formaldehyde condensate | 30-40 | 32-37 | 33-35 |
| Sugar alcohol | 5-15 | 9-13 | 11-12 |
| Urea | 5-10 | 6-9 | 6.8-7.9 |
| PVP | 0.01-3 | 0.1-1 | 0.1-0.4 |

Table 2 shows a further overview with three embodiments each (embodiments 4, 5 and 6) for component A and component B. The quantities of the individual ingredients are expressed in mass percent. It is understood that the mass specifications of the individual ingredients of the individual embodiments can be combined to form further embodiments. This also applies in combination with the embodiments 1 to 3 shown in Table 1.

TABLE 2

Embodiment 4 to 6 for component A and component B.

| Component | Embodiment 4 [% mass] | Embodiment 5 [% mass] | Embodiment 6 [% mass] |
|---|---|---|---|
| Component A | | | |
| Solvents | 47-49 | 48.15-48.24 | 48.16 |
| Sulfonic acid | 25-27 | 25.5-26.4 | 26.00 |
| Inorganic Acid 75% | 8.4-8.9 | 8.65-8.74 | 8.67 |
| Sulfamic acid | 2.9-3.3 | 3.0.5-3.14 | 3.13 |
| Arylsulfonic acid 65% | 2.5-2.9 | 2.65-2.74 | 2.65 |
| Monohydric Alcohol | 2.4-2.8 | 2.55-2.64 | 2.60 |
| Diphenol | 2.2-2.6 | 2.35-2.44 | 2.40 |
| PEG | 4.2-4.5 | 4.25-4.34 | 4.34 |
| Dialcohol | 1.7-2.1 | 1.85-1.94 | 1.93 |
| Bisphenol | 0.09-0.13 | 0.05-0.14 | 0.12 |
| Component B | | | |
| Solvent | 44-47 | 46.55-46.64 | 46.611 |
| Urea formaldehyde condensate | 33.5-34.5 | 34.25-34.34 | 34.290 |
| Sugar alcohol | 11.2-11.8 | 11.45-11.54 | 11.500 |
| Urea | 7.2-7.5 | 7.345-7.354 | 7.353 |
| PVP | 0.2-0.3 | 0.245-0.254 | 0.246 |

Another aspect of the invention relates to the provision of an absorbent according to claim 9.

Specifically, this absorbent is a multi-component absorbent which comprises a component A and a component B and which can be combined with any of the previously mentioned embodiments and with any of the embodiments yet to be mentioned, unless in contradiction thereto.

The absorbent is an organic and biodegradable porous body, manufactured on an amino resin basis. It has a density in the order of 10 $kg/m^3$, in particular from 5 $kg/m^3$ to 30 $kg/m^3$, for example from 10 $kg/m^3$ to 20 $kg/m^3$. The composition of the absorbent enables a highly effective and economical absorption of oils, such as crude oils, as well as organic solvents of all kinds and many other chemicals. Substances which have a lower specific weight than water can be filtered out and collected on the water. Due to the large surface area and high capillarity of the absorbent, 80-90 times its own weight of oil of varying viscosity can be quickly absorbed. This corresponds to approximately 80 percent by volume % vol. In the stable three-dimensional cell structures of the absorbent, the stored liquid, such as oil, remains stored.

A further aspect of the invention, which may be combined with any of the embodiments already mentioned and with any of the embodiments yet to be mentioned, unless in contradiction thereto, relates to the provision of a method for producing an absorbent, comprising the steps:
a) Mixing component A with a gas to produce a mixture;
b) Foaming the mixture by alternately compressing and expanding to produce a foam;
c) Mixing the foam with component B to produce another mixture;
d) Drying of the further mixture.

In an embodiment of the method for producing the absorbent according to the invention, which can be combined with any of the embodiments already mentioned and with any of the embodiments yet to be mentioned, unless in contradiction thereto, the method additionally comprises the step:
e) Diluting component A with solvent, especially in a ratio of 1:13, before step a).

The solvent can be water, for example. Component A is first provided as a concentrate in a composition as e.g.

described in claims 1 to 3 and in the previous part of the description and then diluted to produce a working solution. This working solution or diluted component A is then mixed with gas and foamed before being mixed with component B, which usually does not need to be diluted, before use. For example, to prepare a working solution of component A, 8 liters of component A can be diluted with 104 liters of solvent to produce 112 liters of working solution.

In an embodiment of the method for producing the absorbent according to the invention, which can be combined with any of the embodiments already mentioned and with any of the embodiments still to be mentioned, unless in contradiction thereto, a part of component A is used in the step of mixing component A with the gas to produce a mixture and 14 to 42, in particular 28 parts, of component B are used in the step of mixing the foam with component B.

For this purpose, component A can be "diluted" in two steps, for example. In a first step one part of component A is pre-diluted with e.g. 13 parts of solvent. This results in 14 parts of working solution. In a second step, the 14 parts of working solution containing one part of component A are then mixed in a ratio of 1:2, i.e. with 28 parts of pure component B, so that the absorbent finally consists of one part of component A and 28 parts of component B. If one part of working solution and one part of component B are used, the absorbent finally consists of one part of component A and 14 parts of component B. If one part of working solution and three parts of component B are used, the absorbent finally consists of one part of component A and 42 parts of component B. Depending on the ageing of the components, temperature, humidity etc. it may be necessary to adjust the composition of the absorbent individually, e.g. by more or less pre-diluting component A (e.g. in the range 1:10 to 1:20) to produce the working solution, and/or by changing the amount of component B in relation to the amount of component A used. For components that have not yet aged significantly, however, a ratio between 1:26 and 1:30, in particular 1:28, has proven to be very suitable.

Another aspect of the invention relates to the provision of a device according to claim 13.

Specifically, this device is a device for producing an absorbent, which comprises a premixing zone with at least two inlet openings. The device further comprises a foaming zone adjacent to and in fluid connection with the premixing zone, which has a plurality of chambers in fluid connection with each other and filled with mechanical particles. In addition, the device comprises a mixing zone adjacent to and in fluid connection with the foaming zone, which is in fluid connection with a feed channel and has an outlet opening spaced therefrom. The filling quantity of the individual chambers is not the same.

In an embodiment of the device according to the invention, which can be combined with any of the embodiments yet to be mentioned, unless in contradiction thereto, the filling quantity of the individual chambers increases from the side of the foaming zone adjacent to the premixing zone to the side of the foaming zone adjacent to the mixing zone.

Such an increase can be gradual, but does not have to be. This means that either each subsequent chamber can have a larger filling quantity than the previous one, or that the filling quantity of the first chamber is smaller than that of the last chamber, but that for the chambers in between, not each subsequent chamber must have a larger filling quantity than the previous one, but the filling quantity can also stagnate over several chambers.

Another aspect of the invention which may be combined with any of the aforementioned embodiments and with any of the embodiments yet to be mentioned, unless in contradiction thereto, relates to the provision of an absorbent manufactured by a method comprising the steps:
a) Mixing a component A with a gas to produce a mixture;
b) Foaming the mixture by alternately compressing and expanding to produce a foam;
c) Mixing the foam with a component B to produce another mixture;
d) Drying of the further mixture.

Both an absorbent produced by the method just described and an absorbent produced from a component A and a component B can be used to absorb a liquid. The reaction time when mixing the foam with component B, for example, is between 60 and 120 s, in particular at 90 s. In the drying phase of the mixture of component B and the foam, which can also be described as pre-curing phase, an open-pored structure is formed which is suitable for absorbing hydrophobic liquid substances such as oil. Usual drying or pre-curing times are between 6 and 8 h but can be extended by low temperatures or shortened by high temperatures. An optional reduction in the size of the absorbent after drying or pre-curing increases the surface area of the absorbent and can thus improve its effectiveness.

Another aspect of the invention which may be combined with any of the embodiments already mentioned and with any of the embodiments yet to be mentioned, unless in contradiction thereto, is the provision of a method according to claim 17.

Specifically, this method relates to a method for absorbing a liquid, which comprises the following steps:
a) Spreading of an absorbent onto a puddle of liquid, especially in crushed form;
b) Waiting;
c) Removing of the absorbent soaked with the liquid, in particular by skimming or collecting.

For example, the absorbent can be added to the liquid to be removed in shredded form, i.e. in the form of chips, pellets, granules or beads, regardless of whether this liquid has leaked on water or land. On water, liquids that are not easily miscible with water and have a lower density can be absorbed. Due to its special pore structure, the absorbent does not absorb water but the oily liquid that has leaked. The soaked absorbent continues to float on the water and can be scooped from the water surface, while the oil is retained in the capillary spaces due to the interfacial tension. An advantage of collecting the soaked absorbent is that the stability of the absorbent is essentially maintained at full saturation. The nature of the absorbent gives it oleophilic, i.e. oil-attracting, properties and at the same time hydrophobic, i.e. water-repellent, properties. As a result, the absorbent absorbs, for example, oil rather than water. The effect can be enhanced by further comminuting the absorbent, which is present in chips, for example. This is e.g. advantageous for applications on land, for example on the ground, such as on a road. In general, the collection of the soaked absorbent need not occur immediately, as the absorbent is resistant to all hydrocarbon solvents.

Once the absorbent chips are fully soaked after a certain time, they can be collected. In water, this can be done with the help of sieves or nets, for example. A previously laid oil barrier can be used to drive the chips closer together to facilitate the skimming process. On land, for example, the chips can be swept together with a rake and transferred to a suitable container.

The collected, saturated absorbent can then be disposed of in a waste incineration plant, for example. The absorbent provides the advantage that it does not release any toxic gases during combustion and does not contain any CFCs. Alternatively, the absorbed liquid can be recovered by centrifugation or pressing. The latter is more suitable for large quantities of oil. Separate disposal of the liquid and reuse of the absorbent would thus be possible, provided that the structure of the absorbent has not been substantially destroyed by the recovery of the absorbed liquid.

While up to now reference was mainly made to oil, crude oil and solvents, it should be said that the absorbent can also be used in the household, for example to bind cooking oil, such as old frying fat. This can then easily be disposed of with the household waste. Furthermore, the absorbent can also be used to eliminate bad odors in waste. For odor elimination, it is best to use absorbent flakes.

Other areas of application or general uses of the absorbent are:

in trade (e.g.) in industrial processes, machines or other installations, ship operation, tank cleaning, transport etc.

for accidents on land and water for oil-contaminated soil to support oil-splitting microbes; for oxygen supply, as admixture as a filter medium for filtering out water contaminated by oils, fats, paints and all chlorinated and non-chlorinated hydrocarbons and other impurities for use by professional chauffeurs in the daily handling of dangerous goods transporters or otherwise in road traffic as an operational resource by fire brigades and civil protection organizations, environmental protection agencies, etc.

as fillers for arising cavities in the event of explosion hazards, accidents with tank trucks, cisterns, etc., where there is a risk of explosion during salvage, the cavity can be filled with foam on site for all uncontrolled oil spills at sea, not as a mere complement to existing oil pollution control measures, but as a main support feature to successfully combat the increasing pollution of the seas application in general for any oil contamination.

Embodiments of the present invention are explained in more detail below using figures, wherein.

Figure 1:
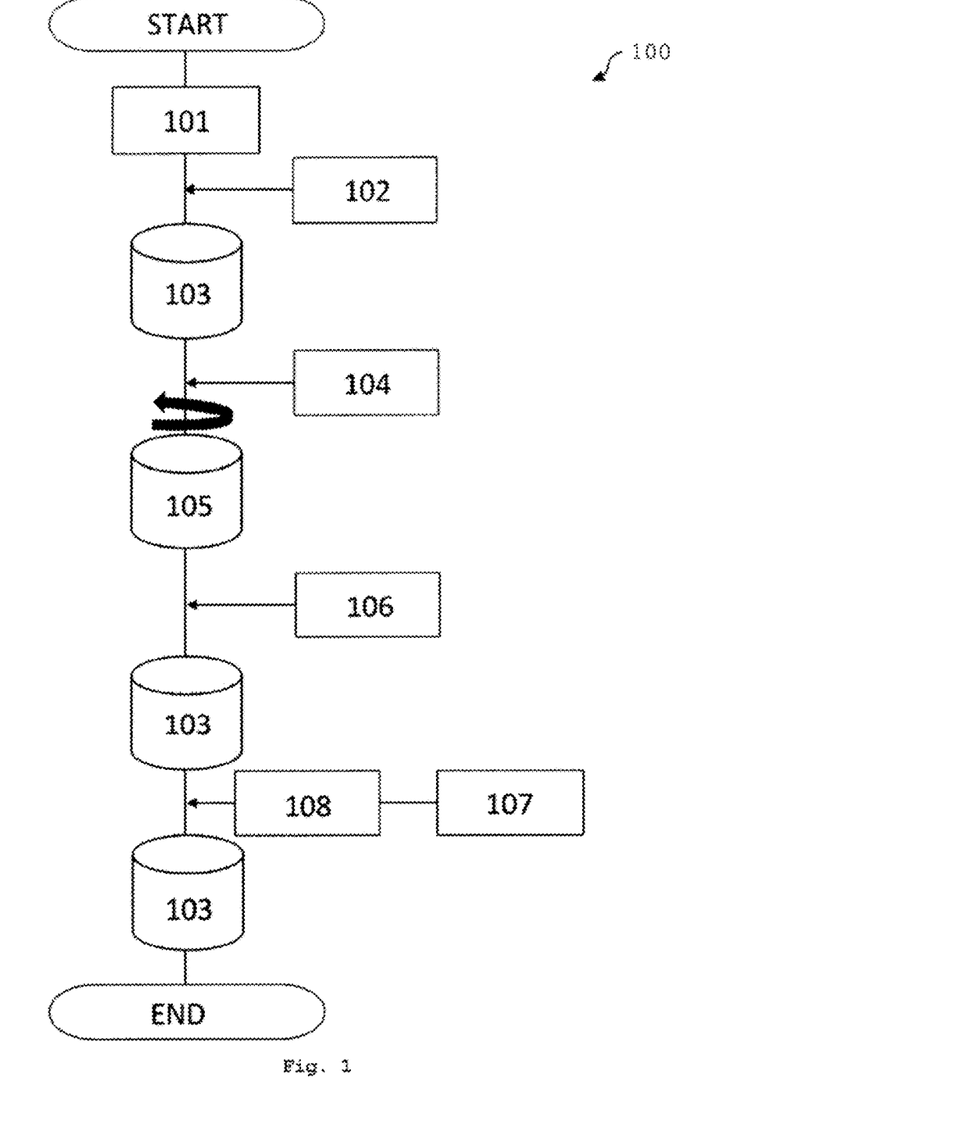
FIG. 1 shows a method according to the invention for the production of a component A.

FIG. 1 shows a method 100 for producing component A. The method begins with the step of heating the solvent 101 to, for example, 50-70° C. Then the addition of sulfamic acid and the sulfonic acid 102 and the mixing 103 are carried out. Alcohol, in particular a monohydric alcohol, is then added 104 and stirred for e.g. at least 15 minutes 105. Then the polyethylene glycol is added 106 and mixed again 103. At the same time or subsequently, the bisphenol can then be dissolved 107, for example in alcohol, in particular in a dialcohol. The dissolved bisphenol is then added, together with the hardener, the adhesion promoter and the inorganic acid 108 and the whole is mixed again 103.

Figure 2:
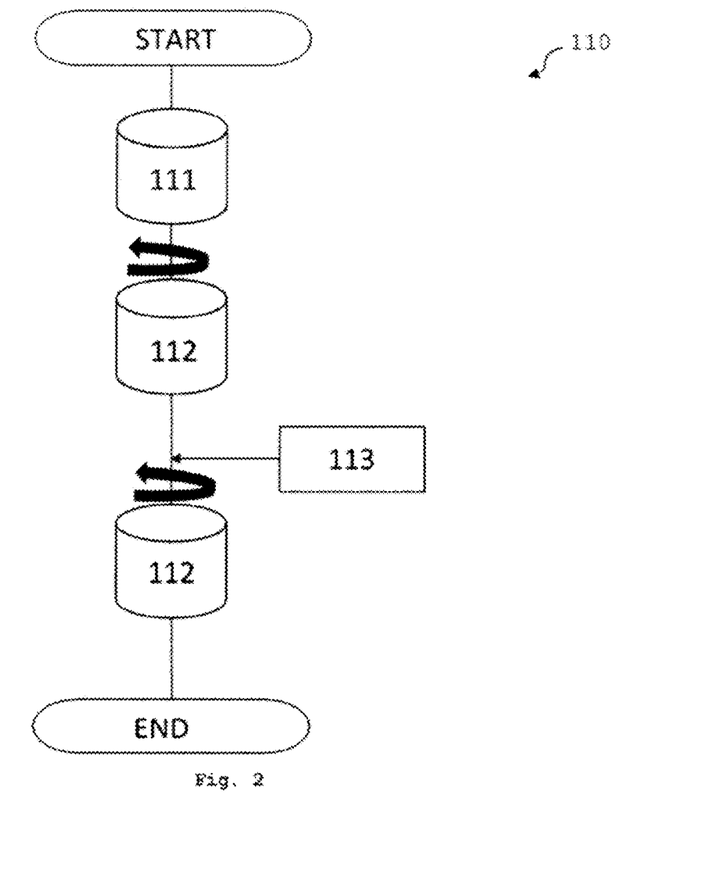
FIG. 2 shows a method according to the invention for the production of a component B.

FIG. 2 shows a method 110 for producing a component B. The method begins with the step of mixing the solvent, the urea-formaldehyde condensate, the sugar alcohol and the diamide 111, followed by stirring 112, for example for a period of 30 min to 3 h, e.g. for 2 h. Then polyvinylpyrrolidone 113 is added and stirring 112 is repeated, for example for a period of 2 h to 6 h, e.g. for 4 h.

Figure 3:
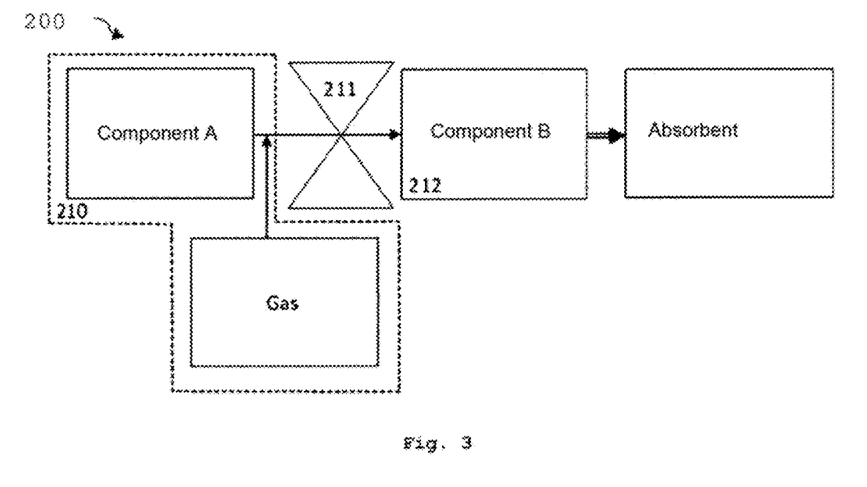
FIG. 3 shows a method according to the invention for the production of an absorbent.

FIG. 3 shows a method 200 for producing an absorbent from component A and component B. In the first step, component A is mixed with a gas 210, for example compressed air or nitrogen. The mixture produced in this step is then foamed 211 by alternating compression and expansion with the aim of generating a foam. This foam is then again mixed with component B 212. Component A is therefore a kind of foaming agent, whereas component B is a resin. The foaming agent creates air bubbles and thus pores in the resin, which polymerizes. During drying or curing (not shown), the pores formed by the air bubbles break open, making the absorbent open-pored and spongy.

Figure 4:
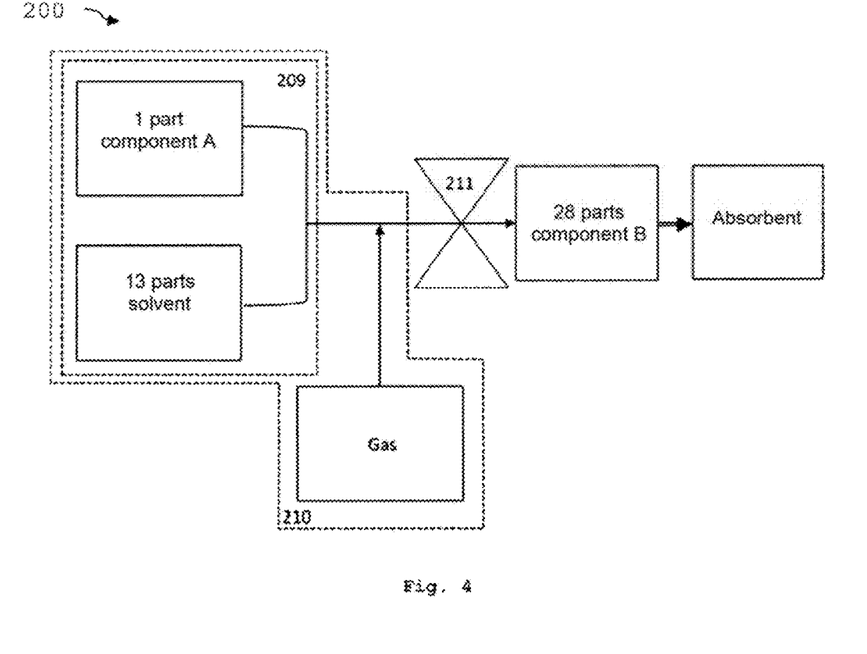
FIG. 4 shows an embodiment of a method according to the invention for producing an absorbent.

FIG. 4 shows an embodiment of method 200 for producing an absorbent from component A and component B. In this illustrated method, the foaming agent, i.e. component A, is first diluted 209 in a ratio of 1:13 with a solvent such as water, before the diluted component A, i.e. the working solution of component A, is mixed with the gas 210. Foaming is achieved by successively compressing and expanding the resulting mixture 211. The foam is then solidified by adding and mixing 212 with the component B, which is the resin. If, for example, 1 part of component A is used, it is diluted with thirteen parts of solvent in the case of a 1:13 dilution. To cure the foam resulting from this mixture, for example, 28 parts of component B are added and mixed 212. The mixing ratio of component A to solvent does not necessarily have to be 1:13. This mixing ratio can, for example, also be between 1:5 and 1:20, in particular between 1:10 and 1:16. The same applies to the ratio of component A to component B. In the above example, this is 1:28, but this mixing ratio can also be between 1:14 and 1:42, in particular between 1:21 and 1:35.

Figure 5:
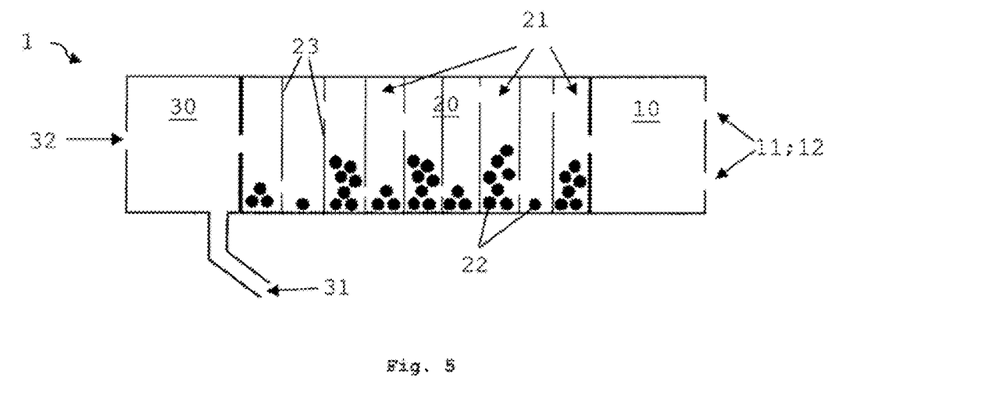
FIG. 5 shows a device according to the invention for the production of an absorbent.

FIG. 5 shows a cross-section of a device 1 for producing an absorbent. The device 1 comprises a premixing zone 10, which has at least two openings 11, 12. Component A or the working solution of component A can be introduced into the premixing zone 10 through one of these openings 11;12 and a gas can be introduced through the other opening 12;11. A foaming zone 20 adjoins the premixing zone 10. The premixing zone 10 and the foaming zone 20 are in fluid connection with each other, i.e. the mixture consisting of component A or the working solution of component A and the gas can pass from the premixing zone 10 to the foaming zone 20. The inlet openings 11, 12 of the premixing zone 10, for example, are arranged at a distance from foaming zone 20. The gas and component A or the working solution of component A do not necessarily have to be introduced into the premixing zone 10 through only one opening 11;12 each; they can also be introduced through several openings or even a plurality of openings. The foaming zone 20 contains several chambers 21, which in turn are filled with mechanical particles 22, such as glass, plastic, Teflon or ceramic beads. For example, the number of chambers 21 can be between three and 30. The device 1 in FIG. 5 has nine chambers 21. The adjacent chambers 21 are in fluid connection. The number or the filling quantity, e.g. expressed in grams, is not identical for all chambers 21, some chambers are filled with more particles, other chambers with less particles 22. For example, some chambers 21 may have the same filling quantity, but the filling quantity of at least one chamber 21 must be different from this filling quantity. Also, the size of the individual chambers 21 need not be identical, but may vary. Some chambers 21 can therefore be larger or wider than other chambers 21. For example, the fluid connection between adjacent chambers 21 is provided by openings in the partition walls 23 separating chamber 21. The two partition walls 23 belonging to a chamber 21 preferably have openings that are not congruent to each other and spaced apart from each other. This means that if one opening is located in the upper part of chamber 21, the other opening is located in the lower part of chamber 21. The mixture is foamed by flowing from one chamber 21 into the next, repeatedly "squeezing" in between through the openings of the chamber walls 23 and then expanding again in the volume of the next chamber 21, which also adjoins this partition wall 23. This alternating compression and expansion thus leads to foaming of the mixture of the gas and component A or the working solution of component A. The foaming process in the foaming zone 20 can be further improved by the mechanical particles 22 in the chambers 21, whose quantity distribution in the individual chambers 21 can influence the foam quality and the foam consistency. To obtain optimum foam consistency, it may also be useful to vary the size and position of the openings in the partition walls 23 that form the fluid connection. For example, the openings of partition walls 23 of every second partition wall 23 can be congruent. In this way a spiral movement of the mixture in foaming zone 20 can be achieved. Adjacent to and in fluid connection with foaming zone 20 is mixing zone 30, which, for example, adjoins foaming zone 20 in such a way that it is arranged spaced apart from premixing zone 10 or even on the opposite side. On the one hand, the foamed foam from foaming zone 20 penetrates into mixing zone 30 and, on the other hand, component B can be introduced into it via a feed channel 31. In mixing zone 30, component B and the gas-foamed component A or the foamed working solution of component A are mixed and form the still moist absorbent there, which can escape from the device 1 via the outlet opening 32.

Figure 6:
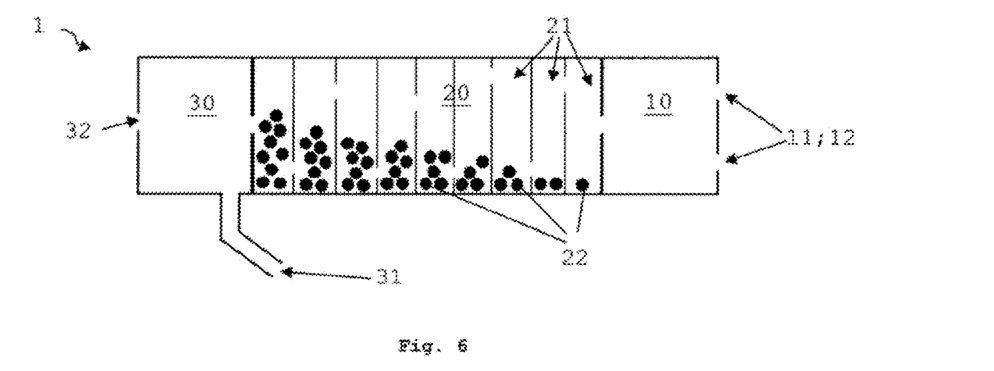
FIG. 6 shows an embodiment of a device according to the invention for the production of an absorbent.

The device 1 shown in FIG. 6, which is shown in cross-section, differs essentially in the filling quantity of the individual chambers 21 in the foaming zone 20. The filling quantity increases gradually from the first to the last chamber 21. In other words, each subsequent chamber 21, viewed from premixing zone 10 to mixing zone 30, has a higher filling quantity than the previous chamber 21.

For example, a device with eight chambers can be filled with mechanical particles, especially glass beads, as follows:

| | |
|---|---|
| Chamber 1: | 30 g |
| Chamber 2: | 40 g |
| Chamber 3: | 50 g |
| Chamber 4: | 60 g |
| Chamber 5: | 70 g |
| Chamber 6: | 80 g |
| Chamber 7: | 90 g |
| Chamber 8: | 100 g |

However, a successive increase of the filling quantity is not mandatory. For example, a device with eight chambers can also be filled with mechanical particles, especially glass beads, as follows:

| | |
|---|---|
| Chamber 1: | 30 g |
| Chamber 2: | 40 g |
| Chamber 3: | 40 g |
| Chamber 4: | 60 g |
| Chamber 5: | 60 g |
| Chamber 6: | 80 g |
| Chamber 7: | 100 g |
| Chamber 8: | 120 g |

A further example for a distribution of mechanical particles, especially glass beads, to 8 chambers would be:

| | |
|---|---|
| Chamber 1: | 30 g |
| Chamber 2: | 40 g |
| Chamber 3: | 40 g |
| Chamber 4: | 60 g |
| Chamber 5: | 60 g |
| Chamber 6: | 80 g |
| Chamber 7: | 90 g |
| Chamber 8: | 90-120 g |

Figure 7:
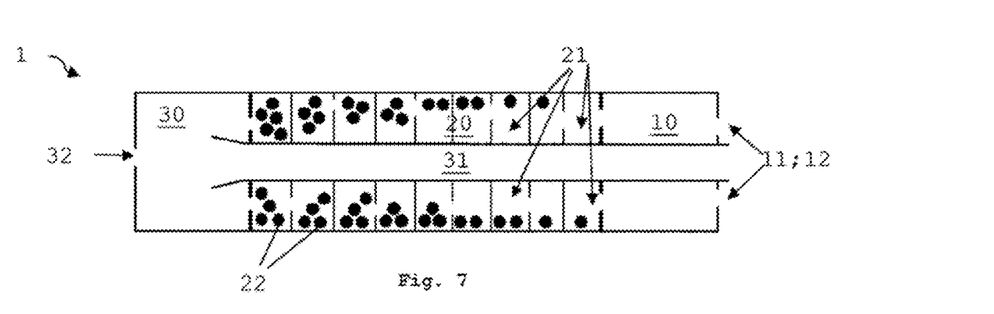
FIG. 7 shows a further embodiment of a device according to the invention for the production of an absorbent.

FIG. 7 shows a cross-section of another embodiment of device 1 for producing an absorbent. This embodiment differs from the previous ones in particular in the arrangement of the feed channel 31. The premixing zone 10, the foaming zone 20 and the mixing zone 30 together form a cylindrical base body. The feed channel 31 now extends within the premixing zone 10 and the foaming zone 20, but is not in fluid connection with them, and opens into the mixing zone 30. Component A or the working solution of component A (e.g. via opening 11), the gas (e.g. via opening 12) and component B (via channel 31) can all be fed in this embodiment into device 1 via one side of the device, namely via the side of the premixing zone 10. The feed channel 31 is designed so that the last 1 cm to 2 cm are funnel-shaped.

Component A, which is also known as the foaming agent, or the working solution of component A, component B, which is also known as the resin, and the gas can be provided in tanks and connected by hoses to the device 1 via the inlet openings 11, 12 and the supply channel 31. The hoses can have a length of at least 2 m, in particular from 3.5 m to 5 m. For example, the flow rate of component A or the working solution of component A, e.g. in a 1:13 dilution, is adjusted so that it is approx. 1100 g/min to 1330 g/min, in particular 1250 g/min to 1330 g/min. The flow rate of component B, for example, is 2200 g/min to 3500 g/min, in particular 3400 g/min to 3500 g/min. With a density of the working solution of component A of, for example, approx. 1.0 kg/L and a density of component B of, for example, approx. 1.25 kg/L, the result is a ratio by volume of approx. one part working solution of component A to approx. 1.2 to 2.6 parts of component B, in particular of approx. one part working solution of component A to approx. 2.0 to 2.3 parts of component B. In mixing zone 30, for example, components A and B remain for a reactivity time of 60 s to 120 s, in particular of 90 s. Afterwards the still moist reaction product, i.e. the absorbent, can be dried for 4 h to 10 h, in particular for 6 to 8 h. The density of the dried absorbent, for example, is between 14 kg/m$^3$ and 18 kg/m$^3$.

Figure 8:
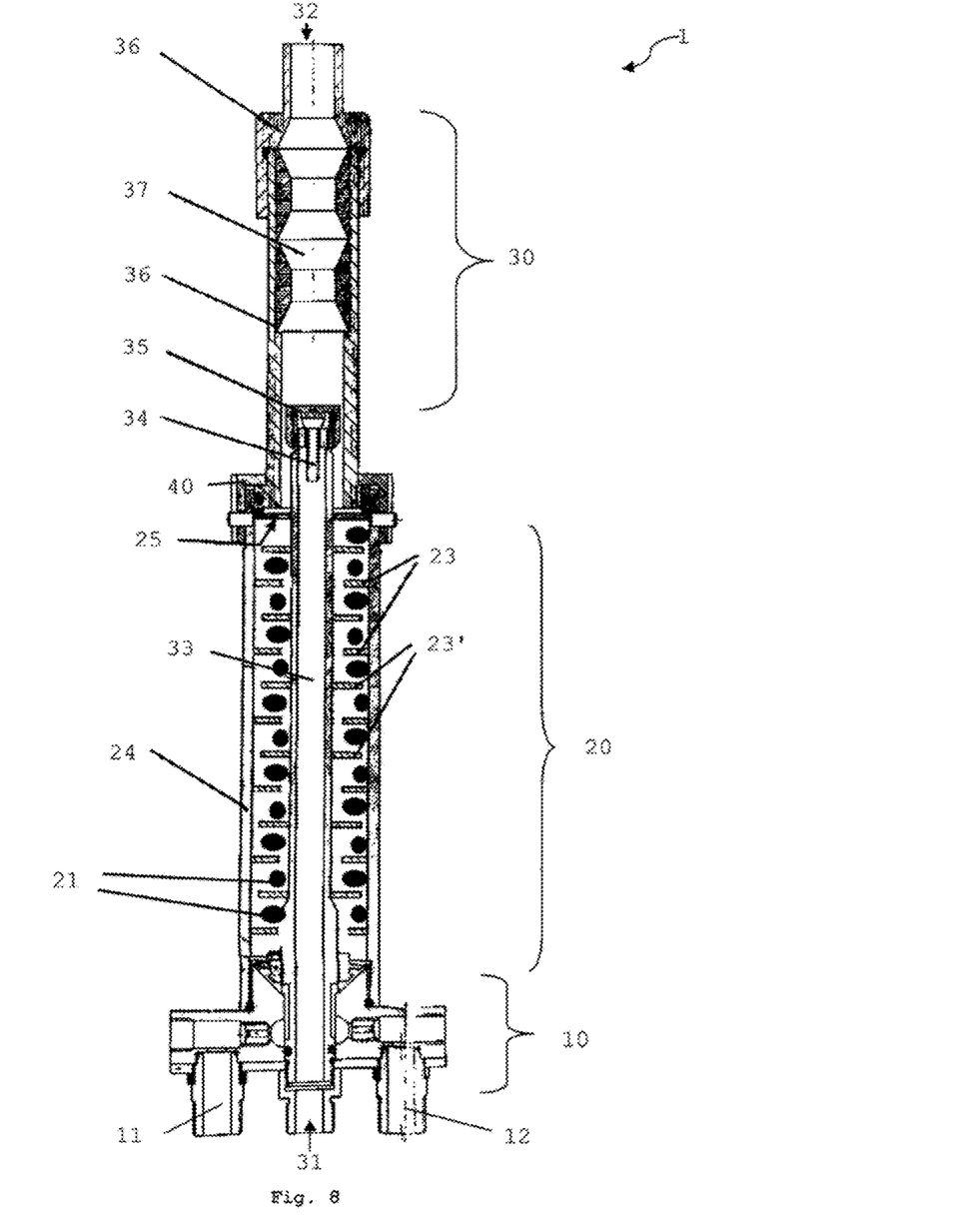
FIG. 8 shows a further embodiment of a device according to the invention for the production of an absorbent.

FIG. 8 shows a cross-section of another embodiment of a device 1 for producing an absorbent. The figure shows the areas of the premixing zone 10, the foaming zone 20 and the mixing zone 30. The two inlet openings 11, 12 and the feed channel 31 are located in the area of the premixing zone 10. The foaming zone comprises several chambers 21, which are separated from each other by partitions 23, 23' and are filled with mechanical particles 21 to different filling quantities.

The feed channel 31 extends through the premixing zone 10 and the foaming zone 20 and opens into the mixing zone 30. The feed channel 31 is formed or encased by a resin pipe 33. The foaming zone 20 is formed or encased by a foam pipe 24. The partition walls 23 are formed by discs which have an inner recess corresponding to the cross-sectional area of the resin pipe 33 and which discs have a radius smaller than the inner radius of the foam pipe 24. This leaves a gap to the foam pipe 24 which serves as an opening for establishing a fluid connection. The partition walls 23' are formed by discs which have an inner recess which is larger than the cross-sectional area of the resin pipe 33 and which discs have a radius which corresponds to the internal radius of the foam pipe 24. This leaves a gap to the resin pipe 33 which serves as an opening for establishing a fluid connection. Before the foam can pass from foaming zone 20 into mixing zone 30, it must pass through a sieve 25 located at the end of foaming zone 20. The mixing zone 30 and the foaming zone 20 are connected by means of a union nut 40. Component B, coming from the resin pipe 33, enters the mixing sleeve 37, which is arranged in a mixing tube 36, via a nozzle cone 34 and a resin nozzle 35. The 2-component absorbent mixed in the mixing sleeve 37 then leaves the device via the outlet opening 32.

Figure 9:
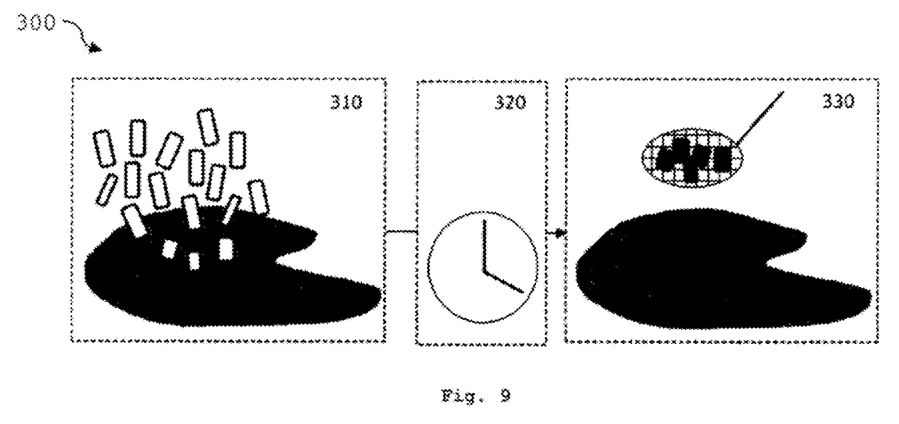
FIG. 9 shows a method according to the invention for absorbing a liquid.

FIG. 9 shows a method 300 for absorbing a liquid. The figure shows a puddle of liquid on which, in a first step, an absorbent is sprinkled, in particular in crushed form (310). In a next step, one waits (320) until the absorbent is saturated or until the liquid has been substantially completely absorbed. Depending on the nature of the liquid, e.g. depending on its viscosity, this can be the case immediately after spreading, for example, or it can take a few minutes or even hours (e.g. between 5 min and 10 h). In the following step, the absorbent, possibly fully saturated with the liquid, is absorbed (330), in particular by skimming or collecting. Afterwards (not shown here) the saturated absorbent can be incinerated or the liquid can be recovered by pressing or centrifugation.

LIST OF REFERENCE SIGNS

| | |
|---|---|
| 1 | Device for producing an absorbent |
| 10 | Premixing zone |
| 11, 12 | Inlet opening |
| 20 | Foaming zone |
| 21 | Chamber |
| 22 | Particles |
| 23 | Partition wall |
| 24 | Foam pipe |
| 25 | Sieve |
| 30 | Mixing zone |
| 31 | Feed channel |
| 32 | Outlet opening |
| 33 | Resin pipe |
| 34 | Nozzle cone |
| 35 | Resin nozzle |
| 36 | Mixing tube |
| 37 | Mixing sleeve |
| 40 | Union nut |
| 100 | Method for producing a component A |
| 101 | Heating |
| 102 | Adding sulfamic acid and the sulfonic acid |
| 103 | Mixing |
| 104 | Adding alcohol |
| 105 | Stirring |
| 106 | Adding the polyethylene glycol |
| 107 | Dissolving the bisphenol |
| 108 | Adding the dissolved bisphenol, hardener, adhesion promoter and inorganic acid |
| 110 | Method for producing a component B |
| 111 | Mixing of the solvent, urea-formaldehyde condensate, sugar alcohol and diamine |
| 112 | Stirring |
| 113 | Adding the polyvinylpyrrolidone |
| 200 | Method for producing an absorbent |
| 209 | Diluting component A |
| 210 | Mixing component A with a gas |
| 211 | Foaming of the mixture |
| 212 | Mixing the foam with component B |
| 300 | Method for absorbing a liquid |
| 310 | Scattering of an absorbent |
| 320 | Waiting |
| 330 | Absorption of the soaked absorbent |

The invention claimed is:

1. Component A, comprising:
Solvent, in particular inorganic solvent;
Sulfonic acid;
Inorganic acid;
Sulfamic acid;
Hardener, in particular aryl sulfonic acid;
Alcohol, in particular monohydric and dihydric alcohol;
Adhesion promoter;
Polyethylene glycol;
Bisphenol.

2. Component A according to claim 1, comprising:
Water as a solvent;
Alkylbenzene sulfonic acid as sulfonic acid;
Phosphoric acid as an inorganic acid;
Sulfamic acid;
Xylene sulfonic acid as hardener;
Hexadecanol and/or octadecanol as monohydric alcohol;
Resorcinol as adhesion promoter;
Polyethylene glycol 550 and/or polyethylene glycol 1000 as polyethylene glycol;
Butanediol, in particular 1.4 butanediol, as dihydric alcohol;
Bisphenol A as bisphenol.

3. Component A according to claim 1, comprising 40-60% solvents, in particular 48.2%;
20-30% sulfonic acid 65%, in particular 26.0%;
1-12% inorganic acid 75%, in particular 8.7%;
1-6% sulfamic acid, in particular 3.1%;
1-5% hardener; in particular 2.7%;
1-5% monohydric alcohol, in particular 2.6%;
1-5% adhesion promoter, in particular 2.4%;
2-8% polyethylene glycol; in particular 4.3%;
0.5-5% dihydric alcohol, in particular 1.9%;
0.01-1% bisphenol; in particular 0.1%.

4. Component B, comprising:
Solvent, in particular inorganic solvent;
Urea-formaldehyde condensate;
Sugar alcohol;
Diamide;
Polyvinylpyrrolidone.

5. Component B according to claim 4, comprising:
Water as a solvent;
Basopor®293 as urea-formaldehyde condensate;
Sorbitol as sugar alcohol;
Urea as diamide;
Polyvinylpyrrolidone K-90 as polyvinylpyrrolidone.

6. Component B according to claim 4, comprising:
35-55% solvents, in particular 46.6%;
30-40% urea-formaldehyde condensate, in particular 34.3%;
5-15% sugar alcohol 70%, in particular 11.5%;

5-10% diamide, in particular 7.35%;
0.01-3% polyvinylpyrrolidone, in particular 0.25%.

7. Method for producing (100) a component A according to claim 1, comprising the steps of:
   a) Heating the solvent (101);
   b) Adding the sulfamic acid and the sulfonic acid (102);
   c) Mixing (103);
   d) Adding alcohol (104);
   e) Stirring (105);
   f) Adding the polyethylene glycol (106);
   g) Mixing (103);
   h) Dissolving the bisphenol (107);
   i) Adding the dissolved bisphenol, hardener, adhesion promoter and inorganic acid (108);
   j) Mixing (103).

8. Method for producing (110) a component B according to claim 4, comprising the steps of:
   a) Mixing the solvent, urea-formaldehyde condensate, sugar alcohol and diamide (111);
   b) Stirring (112);
   c) Adding the polyvinylpyrrolidone (113);
   d) Stirring (112).

9. Absorbent produced from the component A according to claim 1; and
   a component B comprising:
   Solvent, in particular inorganic solvent;
   Urea-formaldehyde condensate;
   Sugar alcohol;
   Diamide; and
   Polyvinylpyrrolidone.

10. Method for producing (200) the absorbent from the component and the component B according to claim 9, comprising the steps of:
    a) Mixing component A with a gas to produce a mixture (210);
    b) Foaming the mixture by alternately compressing and expanding to produce a foam (211);
    c) Mixing the foam with component B (212) to produce another mixture;
    d) Drying of the further mixture.

11. Method (200) according to claim 10, additionally comprising the step of:
    e) Diluting component A with solvent (209);
    in particular in the ratio 1:13 before step a).

12. Method (200) according to claim 10, wherein
    in the step of mixing the component A with the gas for producing a mixture (210), a portion of the component A is used; and
    in the step of mixing the foam with the component B (212), 14 to 42 parts, in particular 28 parts, of component B are used.

13. Device (1) for producing an absorbent, comprising:
    a premixing zone (10) with at least two inlet openings (11, 12);
    a foaming zone (20) adjacent to and in fluid connection with said premixing zone, said foaming zone comprising a plurality of chambers (21) in fluid connection with one another and filled with mechanical particles (22);
    a mixing zone (30) adjacent to and in fluid connection with said foaming zone, said mixing zone being in fluid connection with a feed channel (31) and having an outlet opening (32) spaced therefrom;
    characterized in that the filling quantity of the individual chambers (21) is not equal.

14. Device (1) according to claim 13, wherein the filling quantity of the individual chambers (21) increases from the side of the foaming zone (20) adjacent to the premixing zone (10) to the side of the foaming zone (20) adjacent to the mixing zone (30).

15. Absorbent produced by a method comprising the steps of:
    a) Mixing a component A according to claim 1 with a gas to produce a mixture (210);
    b) Foaming the mixture by alternately compressing and expanding to produce a foam (211);
    Mixing the foam with a component B to produce another mixture (212), the component B comprising:
    Solvent, in particular inorganic solvent
    Urea-formaldehyde condensate;
    Sugar alcohol;
    Diamide; and
    Polyvinylpyrrolidone;
    c) Drying of the further mixture.

16. Use of the absorbent according to claim 9 for absorbing a liquid.

17. Method (300) for absorbing a liquid, comprising the steps of:
    a) Spreading an absorbent according to claim 9 onto a liquid puddle (310), in particular in crushed form;
    b) Waiting (320);
    c) Removing the absorbent (330) soaked with the liquid, in particular by skimming or collecting it.

* * * * *